Nov. 26, 1963   W. M. WILLIS ETAL   3,112,129
UNIVERSAL JOINT FOR TUBE SECTIONS OF A FLUID LINE
Filed Sept. 8, 1958   2 Sheets-Sheet 2
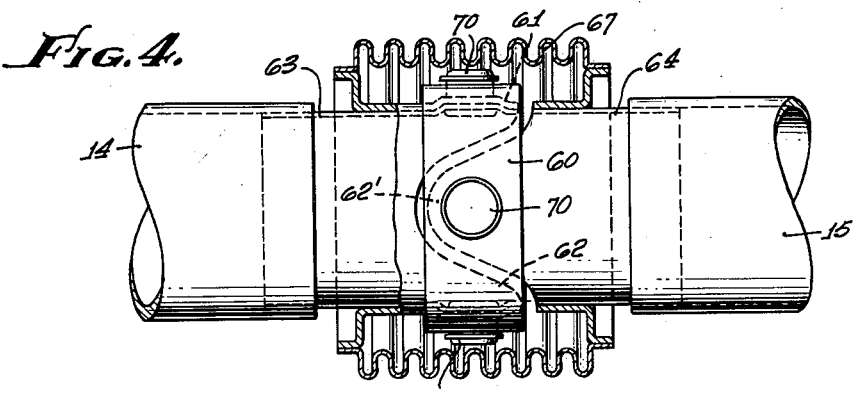
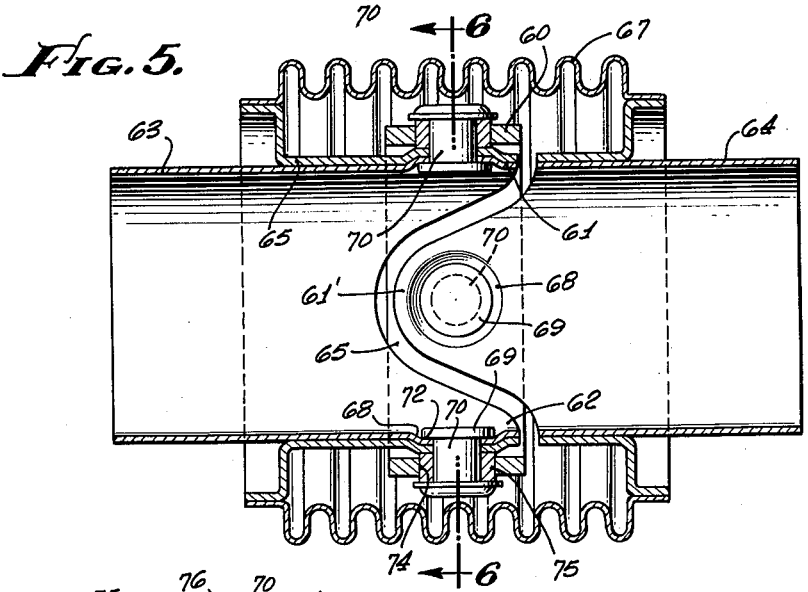
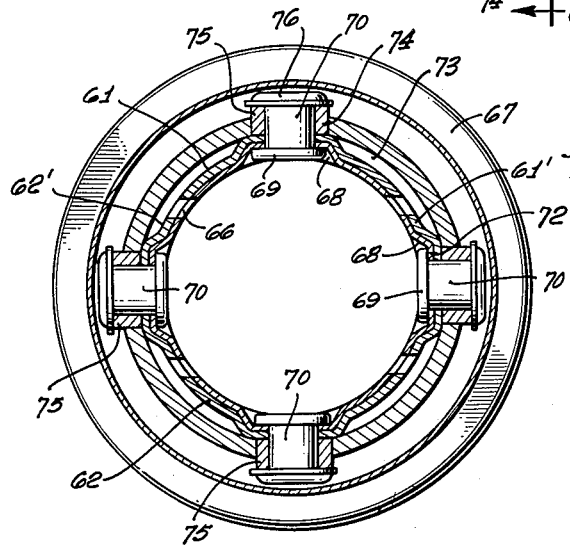
WILLIAM M. WILLIS,
ALVIN L. BECKER
INVENTORS.
BY
Huebner & Worrel
ATTORNEYS.

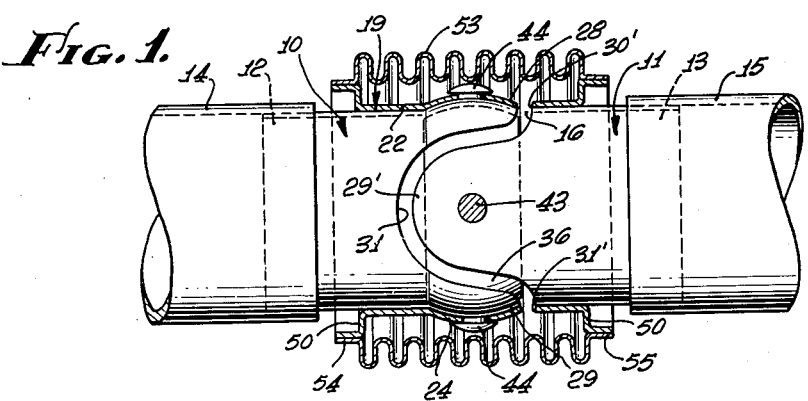

United States Patent Office 3,112,129
Patented Nov. 26, 1963

3,112,129
UNIVERSAL JOINT FOR TUBE SECTIONS
OF A FLUID LINE
William M. Willis, Northridge, and Alvin L. Becker, Inglewood, Calif., assignors to Aeroquip Corporation, Jackson, Mich., a corporation of Michigan
Filed Sept. 8, 1958, Ser. No. 759,617
10 Claims. (Cl. 285—226)

This invention relates to universal joints for interconnecting two tube sections of a fluid line to permit angular misalignment and torque transmission between the tube sections.

An object of this invention is to provide a fluid-tight joint for tube sections of a fluid line which permits swivelling at any angle and permits transmission of torque from one tube section to the other.

A more specific object is to provide a joint for tube sections in which the adjacent ends of the tube sections are pivotally connected to a gimbal ring to permit swivelling at any angle, and a flexible sleeve encloses the interconnected ends of the tube sections to provide a fluid-tight joint.

A particular object of this invention is to provide a universal joint of the above mentioned character in which the flexible sleeve is mounted upon the end portions of the tube sections through a supporting structure which in turn is directly engaged by the pivot means by which the tube sections are pivotally secured to the gimbal ring.

A further object of this invention is to provide a universal joint of the above mentioned character having a structure such that the joint may be designed to relatively small overall radial dimensions as compared with prior joints of this general type.

A still further object is to provide a universal joint of the above mentioned character which is rugged and is reliable in service and is capable of being manufactured relatively simply and inexpensively.

Further objects and advantages of the invention will appear during the course of the following part of this specification, wherein the details of construction and mode of operation of two embodiments thereof are described with reference to the accompanying drawing in which:

FIG. 1 is a side elevation of a universal joint of this invention with the outer portions thereof being shown in central longitudinal section;

FIG. 2 is a longitudinal central section through the joint of FIG. 1;

FIG. 3 is a cross section through the joint taken along line 3—3 of FIG. 2;

FIG. 4 is a side elevation of another joint embodying this invention with certain portions thereof being cut away and certain outside portions thereof being shown in central longitudinal section;

FIG. 5 is a central longitudinal section through the joint of FIG. 4; and

FIG. 6 is a cross section taken along line 6—6 of FIG. 5.

Referring to the drawing in greater detail, and in particular to FIGS. 1-3 thereof, there is shown a universal joint of this invention comprising two tube sections 10 and 11 arranged in axially aligned, end toward end relationship with the remote end portions 12 and 13 thereof, respectively, being welded or otherwise suitably secured within respective pipes 14 and 15 of a fluid line. The tube sections 10 and 11 may, of course, be of any desired axial length, but are illustrated in a preferred form as being of short length for attachment to the longer pipe sections 14 and 15.

An important advantage of the joints of this invention is that they are especially well suited to be formed from a single length of a tube rather than being formed from two separate tube sections. In order to facilitate explanation of the details of construction of the joint, it will be described as though it were formed from a single tube, which is divided along a circumferentially extending and curvingly undulating gap area 16 to provide separate tube sections 10 and 11.

A metal sleeve or band 19 having an inside diameter about equal to the outside diameter of a tube 10, 11 is closely fitted over the tube. The band has end flanges 20 and 21, respectively, projecting radially outwardly from the tube, making the band channel shaped in cross section and having a bottom wall 22 extending between the end flanges. Such bottom wall of the band is laminated to the tube as by resistance welding or preferably by allowing a brazing alloy to flow inwardly between the band and the tube from end edges 23 of the band along which the flanges are bent outwardly from the tube.

The laminated band and tube structure is bulged radially outward at 24 intermediate the end flanges 20 and 21 such that the inside and outside surfaces of the bulge conform to the surface of respective segments of spheres taken between two parallel planes at 25 and 26, respectively, which are normal to the axis of tube 10, 11. The tube is then cut circumferentially thereof at gap 16 which divides the tube into the separated tube sections 10 and 11. The gap 16 crosses the bulge 24 four times thereby to define a pair of diametrically opposed jaws 28 and 29 and a pair of diametrically opposed recesses 30 and 31 for tube section 10, and corresponding jaws 28' and 29' and recesses 30' and 31' for tube section 11. The jaws of one tube section extend into respective recesses of the other tube section. The adjacent end edges of the respective tube sections 10 and 11, which result from forming the gap 16, are designated by reference numerals 32 and 33, respectively, and these end edges may be described as being of undulating configuration with the portions thereof which define the recesses being concave and the portions thereof which define the jaws being convex.

A gimbal ring 36 is disposed coaxially within the bulge 24. It has a cylindrical inside surface 37 which is substantially equal in diameter to the inside diameter of the tube sections 10 and 11, thus to provide a non-restricted smooth-walled section to minimize turbulence in the fluid flowing through the joint.

The outside surface 39 of the gimbal ring conforms to the inside surface of the bulge 24, there being a thin gap 40 between the outside surface of the gimbal ring and the inside surfaces of the jaws 28 etc. to permit relative movement between the jaws and the gimbal ring as will be brought out herein. Each jaw is pivotally fastened to the gimbal ring by respective rivets or pivot pins 41 which function as trunnions.

Each rivet comprises a head 42, a stem 43 and an outer end 44. Each jaw has a hole 45 formed therein for tightly receiving a rivet stem 43 whereby the rivets are held non-rotatable in the jaws. The gimbal ring has radially extending holes 46 formed therein for receiving respective cylindrical brushings 47 which are preferably tight around their respective rivets whereby there is relative rotation along the outside surfaces of the bushings and the walls which define the gimbal holes 46. The bushings are preferably of an axial length such that they will extend from a rivet head 42 to the inside surface of their respective jaws to better fix the rivets in the jaws. Thus the rivets are essentially of stepped construction, the bushings being used in the place of parent metal of the rivets for those instances where metal galling may occur between the rivets and the gimbal ring. The gimbal ring may have countersinks 48 formed therein for accommodating respective heads of the rivets.

After inserting the rivets through the gimbal ring and through the jaws, the outer ends 44 of the rivets are peened or flanged over upon the outside surfaces of the jaws. The gimbal ring is thus suspended by the rivets in centered relation out of contact within the bulged jaws 28, etc.

Referring again to the end flanges 20 and 21 of the band 19, each such flange comprises an annular leg portion 50 extending radially outwardly from the tube sections and an annular cylindrical portion 51 extending coaxially of the respective tube sections and preferably in a direction toward respective remote ends of the tube sections from the outside circumference of the leg portions. The leg portions are designed to position the outside surfaces of the cylindrical portions 51 just beyond the outside surfaces of the head of pins 41 whereby a sleeve 53 of flexible material, and preferably in the form of a metal bellows, may be fitted over the swivelly joined ends of the tube sections. Sleeve 53 makes the joint fluid-tight by being welded or otherwise suitably secured along its cylindrical end portions 54 and 55 to and in flush engagement with respective flange portions 51.

It will be apparent that the above described structure provides a joint for two tube sections of a fluid line permitting swivelling of the tube sections at any angle with respect to each other and permitting transmission or torque from one of the tube sections to the other. Furthermore, the bellows provides for universal-joint flexibility and efficient sealing of the tube joint whereby fluid may be passed through the fluid line without leaks. The laminated structure of band and tube provides ruggedness and strength in having parent metal extend throughout the area of the jaws, and from the pivot pins to the ends of the bellows. Furthermore, the design of the joint is such as to permit the same to be constructed to a minimum outside diameter consonant with fluid-tight sealing and universal flexibility of a tubing joint.

Referring to FIGS. 4, 5 and 6, there is shown another form of a universal joint for pipe sections of a fluid line, according to this invention, it differing essentially from that shown in FIGS. 1–3 in that a gimbal ring 60 thereof is disposed on the outside of jaws 61 and 62 of a tube section 63 and jaws 61′ and 62′ of a tube section 64. This embodiment includes a band 65, a gap 66 and a bellows 67 which correspond to elements 19, 16, and 53 respectively of the embodiment shown in FIG. 1. In the place of a circumferentially extending bulge such as bulge 24 of the first described embodiment, this second form of the invention has pockets or dimples 68 formed on the inside surface of its jaws for accommodating heads 69 of respective pivot pins 70. Such dimples have flat bottom walls 72 whereby the inside annular surface of the heads of the pins will seat flush against the bottom walls of the dimples.

The gimbal ring 60 is spaced radially outwardlly of the jaws 61, etc., at 73 to accommodate rotation of the jaws with respect to the gimbal ring. Gimbal ring 60 has four openings 74 spaced at 90° intervals about the circumference of the ring for rotatably receiving bushings 75 which are disposed around the stem portions of the pivot pins 70. A washer 76 is disposed over the outer end of a bushing 75 to permit peening over the outer end of a pin 70, the pivot pins being non-rotatable in the jaws and the bushings 75 being rotatable in the gimbal ring.

While the instant invention has been shown and described herein, in what are conceived to be the most practical and preferred embodiments, it is recognized that departures may be made therefrom within the scope of the invention, which is therefore not to be limited to the details disclosed herein, but is to be accorded the full scope of the claims.

What we claim is:

1. A universal joint comprising a tube, a circumferentially continuous band closely fitted around the outside of the tube and having two annular end flanges projecting radially outward from the tube, that portion of the band between its end flanges being shaped similarly to the adjacent portion of the tube and being bonded to the tube to make the bonded portions of the band and tube of laminated structure, the laminated portion being cut along a circumferentially extending and curvingly undulating contour too divide the tube and band into two tube sections with each tube section having a pair of diametrically opposed jaws disposed medially between a pair of diametrically opposed recesses, said jaws and recesses being defined by said undulating contour, the jaws of each tube section extending into respective recesses of the other tube section, the tube sections being separated by a gap, a gimbal ring disposed coaxially of the four jaws and spaced slightly from the surfaces of the jaws to allow free relative movement between the jaws and the ring, four radially extending pivot pins spaced at 90° intervals circumferentially of the ring and pivotally connecting the ring to the jaws respectively, said pivot pins each extending through both laminations of the respective jaws, and a sleeve of flexible material surrounding and spaced outwardly from said jaws and recesses and extending axially beyond said gap, the ends of the sleeve being secured circumferentially and fluid-tight to respective end flanges.

2. A universal joint according to claim 1 in which said gimbal ring is disposed within the jaws.

3. A universal joint according to claim 1 in which said gimbal ring is disposed externally of the jaws.

4. A universal joint comprising a tube, a circumferentially continuous band closely fitted around the outside of the tube and having two annular end flanges projecting radially outward from the tube, that portion of the band between its end flanges being shaped similarly to the adjacent portions of the tube and being bonded to the tube to make the bonded portions of the band and tube of laminated structure, the laminated portion being bulged radially outward intermediate the flanges so that the surfaces of the bulge conform to the surface of a segment of a sphere between two parallel planes, the laminated portion being cut along a circumferentially extending and curvingly undulating contour crossing the bulge portion four times to divide the tube and band into two tube sections with each tube section having a pair of diametrically opposed jaws disposed medially between a pair of diametrically opposed recesses, said jaws and recesses being defined by said undulating contour, the jaws of each tube section extending into respective recesses of the other tube section, the tube sections being separated by a gap of circumferentially extending and curvingly undulating contour, a gimbal ring disposed coaxially within the four jaws and spaced slightly from the surfaces of the jaws to allow free relative movement between the jaws and the ring, four radially extending pivot pins spaced at 90° intervals circumferentially of the ring and pivotally connecting the ring to the jaws respectively, said pivot pins each extending through both laminations of the respective jaws, and a bellows surrounding and spaced outwardly from said bulge and extending axially beyond said gap, the ends of the bellows being secured circumferentially and fluid-tight to respective end flanges.

5. A universal joint according to claim 4 in which the inside diameter of the gimbal ring is substantially equal to that of the tube sections.

6. A universal joint comprising two axially opposed tube sections having respective end edges spaced apart by a gap, each tube section having a pair of diametrically disposed recesses formed therein providing a pair of diametrically opposed jaws medially between the recesses whereby said end edges are concavely curved to define the recesses and are convexly curved to define the jaws, the jaws of each tube section extending into respective recesses of the other tube section whereby said gap is of circumferentially extending and undulating contour, a gimbal ring disposed coaxially of the jaws, pivot pins interconnecting the jaws and gimbal ring, each tube section having an outside band bonded in laminated relation thereto and extending throughout the area of the jaws and contiguous the end edges of the recesses, said pivot pins extending through both laminations of the respective jaws, said band having an end flange comprising an annular leg portion extending radially outwardly from the tube and an annular cylindrical portion extending coaxially of its tube section, and a bellows joined fluid-tight at its ends to respective cylindrical portions of the end flanges.

7. A universal joint according to claim 6 in which each pivot pin has a bushing fixed around it, and the bushings are rotatable in the gimbal ring.

8. A universal joint comprising two tube sections disposed in end toward end and substantially axially aligned relationship and having end edges spaced apart by a circumferentially continuous gap, the end edge of each tube section defining a pair of diametrically opposed recesses and a pair of diametrically opposed jaws medially between the recesses, the jaws of each tube section extending into the recesses of the other tube section respectively, a gimbal ring disposed coaxially of the jaws, four radially extending pins spaced at 90° intervals circumferentially of the ring and pivotally connecting the ring to the four jaws respectively, two circumferentially continuous bands encircling and being circumferentially sealed fluid-tight to the tube sections respectively in laminated relation to the tube sections, each band having an end edge defining two diametrically opposed jaw portions and two diametrically opposed recesses between the jaw portions respectively, the jaw portions of the bands extending over the jaws respectively of the tube sections, the jaw portions of the bands being connected directly to the pins respectively, with the pins extending through the respective jaw portions of both the tube sections and the bands, and a sleeve of flexible material surrounding and spaced outwardly from said jaw portions of the bands and extending radially beyond said gap, the ends of the sleeve being secured circumferentially and fluid-tight to the ends of the bands respectively which are remote from said gap.

9. A universal joint according to claim 8, in which the pins are rotatable with respect to the gimbal ring and are non-rotatable with respect to the jaws of the tube sections and the jaw portions of the bands.

10. A universal joint comprising two tube sections disposed in end toward end and substantially axially aligned relationship and having end edges spaced apart by a circumferentially continuous gap, the end edge of each tube section defining a pair of diametrically opposed recesses and a pair of diametrically opposed jaws medially between the recesses, the jaws of each tube section extending into the recesses of the other tube section respectively, two circumferentially continuous bands encircling and being circumferentially sealed fluid-tight to the tube sections respectively in laminated relation to the tube sections, each band having an end edge defining two diametrically opposed jaw portions and two diametrically opposed recesses between the jaw portions respectively, the jaw portions of the bands extending over the jaws respectively of the tube sections, a gimbal ring disposed coaxially of the jaws of the tube sections and the jaw portions of the bands, the ring having four radially extending openings formed therein and spaced at 90° intervals circumferentially of the ring, each jaw of the tube sections and each jaw portion of the bands having axially aligned openings formed therein in axial alignment with the openings in the ring respectively, four pivot pins extending through the axially aligned openings respectively, so that the pins extend through the respective jaw portions of both the tube sections and the bands, each band having an annular end flange projecting radially outward from that end of the band which is remote from said gap, and a bellows surrounding and spaced outwardly from said jaw portions of the bands and extending axially beyond said gap, the ends of the bellows being secured circumferentially and fluid-tight to the remote ends of the bands respectively.

References Cited in the file of this patent

UNITED STATES PATENTS

| | | |
|---|---|---|
| 390,240 | Legot | Oct. 2, 1888 |
| 1,305,656 | Long | June 3, 1919 |
| 1,351,875 | Schreiber | Sept. 7, 1920 |
| 1,627,964 | Galloway | May 10, 1927 |
| 2,473,618 | Stillwagon | June 21, 1949 |
| 2,657,074 | Schwester et al. | Oct. 27, 1953 |
| 2,821,414 | Jensen | Jan. 28, 1958 |
| 2,904,356 | Love | Sept. 15, 1959 |